Feb. 7, 1967 R. R. MAUDUECH ET AL 3,303,287

SUBSCRIBER'S LINE EQUIPMENT FOR TIME-DIVISION TELEPHONE CONCENTRATOR

Filed Jan. 22, 1963 3 Sheets-Sheet 1

INVENTORS

Robert R. MAUDUECH, Raymond P. GOUTTEBEL,

Louis A. PROUTIERE & Emile L. COMMUNAL

BY

Abraham A. Saffitz

ATTORNEY

INVENTORS
Robert R. MAUDUECH, Raymond P. GOUTTEBEL,
Louis A. PROUTIERE & Emile L. COMMUNAL
BY
Abraham A. Saffitz
ATTORNEY Feb. 7, 1967 R. R. MAUDUECH ET AL 3,303,287

SUBSCRIBER'S LINE EQUIPMENT FOR TIME-DIVISION TELEPHONE CONCENTRATOR

Filed Jan. 22, 1963 3 Sheets-Sheet 3

INVENTORS
Robert R. MAUDUECH, Raymond P. GOUTTEBEL
Louis A. PROUTIERE & Emile L. COMMUNAL
BY
Abraham A. Saffitz
ATTORNEY United States Patent Office 3,303,287
Patented Feb. 7, 1967

3,303,287

SUBSCRIBER'S LINE EQUIPMENT FOR TIME-DIVISION TELEPHONE CONCENTRATOR

Robert R. Mauduech, 37 Rue de Marseille, Epinay, France; Raymond P. Gouttebel, 243 Ave. Jean Jaures, Clamart, France; Louis A. Proutiere, 98 Blvd. Auguste Blanqui, Paris, France; and Emile L. Communal, 65 Rue Anatole le Braz, Perros-Guirrec, France Filed Jan. 22, 1963, Ser. No. 253,212
Claims priority, application France, Jan. 26, 1962, 886,055; Nov. 20, 1962, 916,006
4 Claims. (Cl. 179—18)

The present invention relates to a subscriber's line equipment for remote line concentrators comprised in a time-division telephone switching system.

It is known that such concentrators provide, through the control of a telephone central office, the connections between the subscribers, allotting to each of them time slots of a respective cycle, said time slots having, for example, a duration of about six microseconds, in a repetitive cycle of one hundred microseconds.

A connection between two subscribers is thus achieved, at selected time slots, by means of a succession of operations which block or unblock the line circuits of these subscribers, through coincidence gates.

It is well known that this method of connection can be used owing to the fact that the correct reproduction of a speech signal of which the frequency spectrum has an upper limit at the frequency F (F of the order of 5000 c./s. in the case of telephony), does not necessitate the continuous transmission of the amplitude of the signal but only necessitates the transmission of samples of the signal at a rate equal to twice the frequency F.

The plurality of line equipments in a concentrator for time division telephone switching systems therefore has some analogies with telephone equipments for multiplex pulse transmission systems, which transmit serially pulses appropriate to a plurality of telephone channels. In other words, a line equipment in a concentrator for time division switching systems is only a time-division multiplex equipment completed by devices which allow, under the control of the central office, the selection of calling and called subscribers as well as the transmission of calling, dialing and test signals.

Such a concentrator can transmit to the central office and receive from it samples in the form of amplitude modulated pulses or in the form of code modulated binary signal pulses representing the amplitude of these samples, in which case it comprises a coding-decoding circuit which converts the amplitude-modulated pulses into code modulated pulses and vice versa. This latter process, of which one of the advantages lies in the fact that the transmission of code modulated pulses can be made through lines of less exacting characteristics than that of amplitude-modulated pulses, is known, in particular from the article of D. B. James and H. E. Vaughan entitled "Essex—a continuing research experiment in time-separation communications" and published under the reference "Paper No. 3387—November 1960" by the Institution of Electrical Engineers of London. This article describes two applications of the system known as "Essex," the first adapted to transmission by four-wire lines between the subscribers and the concentrator, a complicated system necessitating amongst other things the addition to the concentrator of duplexing means between the transmission and reception subscribers' channels, and the second adapted to transmission by two-wire lines in which stability considerations lead to the division of the sampling pulses into two parts, one reserved for reception and the other for transmission, which implies the use of modulation and demodulation circuits on the one hand and filtering circuits on the other hand which are complex and expensive.

The object of the invention is to provide, in a communication time-division telephone switching system, a subscriber's line equipment capable of connecting a two-wire subscriber's line to a telephone concentrator connected to the central office by a four-wire trunk and in which the transmission and reception channels can be unblocked simultaneously by sampling pulses arriving from the central office by means of an auxiliary trunk, these sampling pulses also serving as pulses for testing the condition of the subscriber's line and for sampling the dialing signals.

According to the invention, in a concentrator pertaining to a time-division telephone switching system, a subscriber's line equipment comprises a duplexer means connecting a two-wire subscriber's line both to a send channel and a receive channel, a pulse modulator and multiplexing circuit inserted in said send channel, a pulse demodulator and demultiplexing circuit inserted in said receive channel, a light source inserted in the subscriber's line and illuminated when said subscriber's line is looped, an auxiliary signalling circuit associated with said subscriber's line, a photoconductive element inserted in said auxiliary signalling circuit and cooperating with said light source and a pulse generator simultaneously feeding said pulse modulator and multiplexing circuit, said pulse demodulator and demultiplexing circuit and said auxiliary signalling circuit.

When the subscriber is not using his station, the auxiliary signalling circuit and the subscriber's line are decoupled from one another, the photoconductive element inserted into the signalling circuit presenting a high resistance. When the subscriber unhooks his handset, the light source is illuminated and the photoconductive element presents a resistance of low value, which indicates at the central office that the subscriber is calling. When the subscriber dials a number, the effect of his dialing is that the light source is illuminated and extinguished owing to the ruptures of the subscriber's line loop, related to the rotation of the dial. In this way dialing pulses are obtained in the signalling circuit. When the subscriber speaks the light source remains illuminated for the whole duration of the conversation, which enables a test voltage, indicating that the subscriber's line is engaged, to be obtained in the signalling circuit. The free state of this same line is obviously indicated by the absence of this voltage.

The invention will be better understood from the following description and with reference to the accompanying drawing in which.

Figure 1:
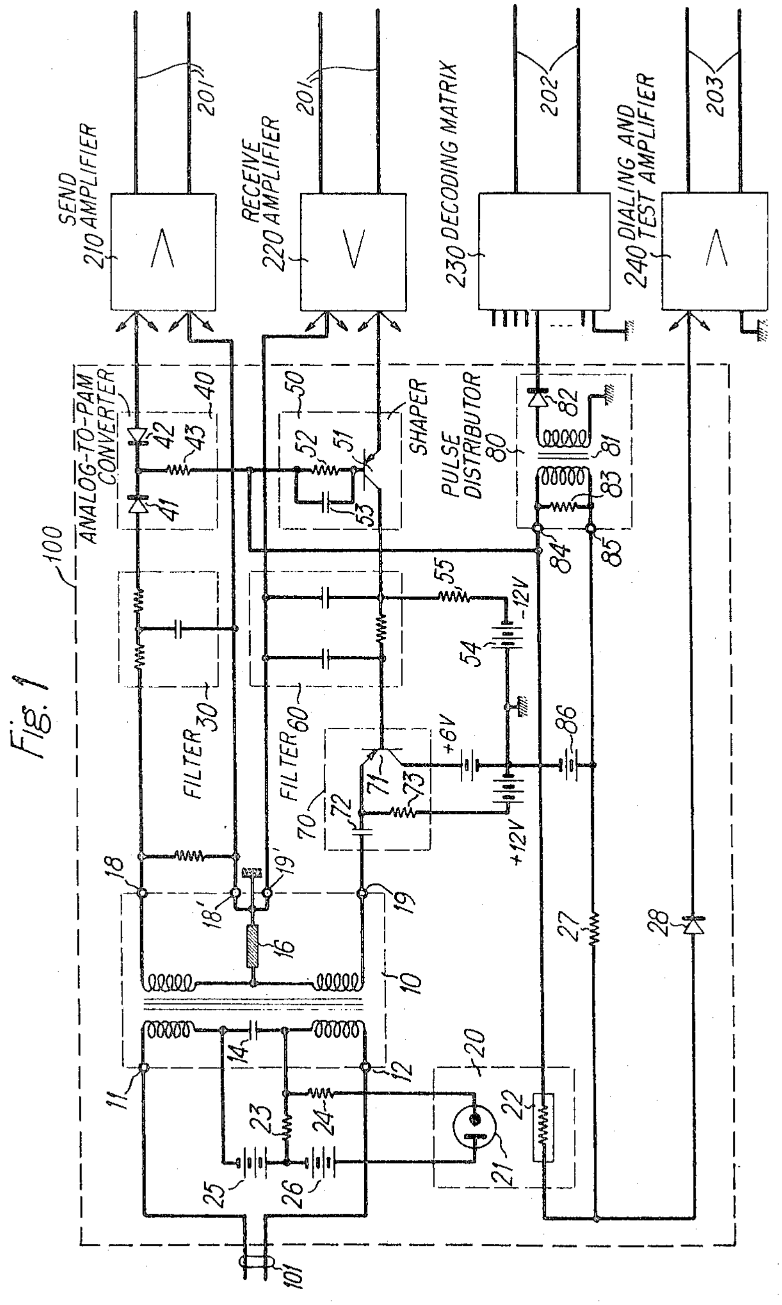
FIG. 1 shows diagrammatically a subscriber's equipment according to a first embodiment of the invention.

Referring now to FIG. 1, the concentrator comprises a plurality of subscriber's line equipment such as 100, one hundred and twenty-eight for example, connected on one side to two-wire subscriber's lines, such as 101, and on the other side connected in parallel to a four-wire trunk 201 through a common send amplifier 210 and a common receive amplifier 220. The trunk 201 connects the concentrator to a remote central office. If it is assumed that the concentrator can provide at the maximum 16 simultaneous conversations, in a cycle of 100 microseconds divided in 16 time intervals of approximately 6 microseconds, the central office sends successively to the concentrator through trunk 202 the addresses of the engaged lines and for the rest of the cycle, addresses of free lines. At each line equipment defined in this manner, a decoding matrix 230 applies selectively a pulse of about 6 microseconds. As will be seen from the following, these pulses serve at the same time as pulses for testing the condition of the subscriber's lines connected to the concentrator and as pulses for sampling and multiplexing the analog speech signals from the engaged subscriber's lines and for demodulating and demultiplexing the amplitude modulated pulses from the central office. Amplifier 240 transmits to the central office the pulses produced by the line equipments in response to these test pulses and amplifier 210 transmits to the central office amplitude-modulated pulses which are samples of the analog speech signal. Amplifier 220 transmits to the line equipments amplitude-modulated pulses coming from the central office to the concentrator.

The subscriber's equipment essentially comprises a conventional duplexer means such as a differential transformer 10 with a two direction terminal 11–12, an output 18–18′ and an input 19–19′ and with which there is associated a circuit 20 for coupling the subscriber's line 101 to the test circuits and to the amplifier 240, a pulse distributor 80, connected to an individual output of the matrix 230, a diode pulse modulator 40 of asymmetric type preceded by a filter 30 and connected to amplifier 210 and a demodulator 50, a filter 60 and an amplifier 70 serially connected to one another and connected to amplifier 220.

The wires of the subscriber's line 101 are connected to the terminals 11 and 12 of differential transformer 10. The central portion of the primary winding of transformer 10 comprises a capacitor 14 to the terminals of which there is connected, in series with a resistor 23, the central battery 25 of the telephonic network. A neon lamp 21, which constitutes with a photo-resistive element 22 the coupling device 20, is connected, in series with an auxiliary source 26 and a resistor 24, to the terminals of the resistor 23. The auxiliary source 26 is connected in such a manner that, in order to fire the neon lamp 21, its voltage is added to the potential drop which is produced across the resistor 23 when this latter is connected to the terminals of the central battery 25 by the closure of the subscriber's loop. The secondary winding of the differential transformer 10 has its midpoint connected to ground by a balancing network 16 which may be, for example, a resistor of the order of 150 ohms.

To the sender terminals 18–18′ of transformer 10, there is connected a chain comprising a low-pass filter 30 and an analog-to-PAM converter or pulse modulator 40. Converter 40 consists of two diodes 41 and 42 connected in series in such a manner that their conductive directions are respectively orientated towards their common point, to which is connected a resistor 43 connected to the pulse distributor 80. This distributor provides sampling pulses of negative polarity which unblock the two diodes 41 and 42 to allow the analog speech signals to pass. The low forward resistance of the diode 41 introduces only a small attenuation and the high inverse resistance of the diode 42 ensures efficient protection against cross-talk between subscribers.

To the receiver terminals 19–19′ of transformer 10, there are connected a shaper 50, a low-pass filter 60 and a transistor amplifier 70, shaper 50 and filter 60 forming together a PAM-to-analog converter and a demultiplexing unit. This chain is designed to demodulate the amplitude-modulated pulses coming from receive amplifier 220, in order to convert them into analog speech signals identical with those generated by the other party.

Shaper 50 is constituted by a transistor 51, the emitter of which receives the amplitude modulated pulses coming from amplifier 220. The base of the transistor 51 is connected, through an R-C circuit 52, 53 to the pulse distributor 80. The negative pulses unblock the transistor 51 and thus permit to be obtained at its collector, which is biased by current source 54 through resistor 55, pulses which are integrated and filtered by resistor 55 and filter 60, eliminating in particular the components at the sampling frequency. Amplifier 70 comprises an emitter follower transistor 71 to the emitter of which there are connected on the one hand a resistor 73 and on the other hand a capacitor 72 which constitutes with the inductance of the half-winding of the secondary winding of transformer 10 connected to terminals 19–19′ a filter network which, associated with the filter 60, ensures a balanced amplification within the frequency spectrum of the analog speech signals of the telephonic modulation.

The sampling pulse distributor 80 comprises a transformer 81 the primary winding of which is connected through the diode 82 to the decoding matrix 230 of the concentrator which is allocated to the selection of subscribers.

The terminals 84 and 85 of the secondary winding of the transformer 81 are connected through a resistor 83. The terminal 84 is connected on the one hand to converter 40 and shaper 50 to which a blocking voltage is applied by a source 86 connected to the terminal 85, on the other hand to the dialing and test amplifier 240 through the intermediary of the diode 28 and a voltage divider constituted by photo-resistive element 22 and resistor 27. The diode 28 constitutes, with the group of similar diodes of the other subscriber's equipments, an OR gate which isolates the resistors 27 of each of the subscriber's equipments one from another.

When the handset of the subscriber station connected to the line 101 is hung up, the lamp 21 is extinguished and the resistance of the photoconductive element 22 is very high, of the order of several megohms. In these conditions, the application by the decoding matrix 230 of a pulse to the transformer 81 does not give an appreciable signal at the terminals of the resistor 27 and no reply pulse is sent to the amplifier 240. Passage in the off-hook condition causes the illumination of the lamp 21 and the reduction of the resistance of the element 22 to a low value, of the order of a few hundred ohms. When the address of the subscriber 101 is sent by the central office to the concentrator, which is assumed to be unsaturated, the pulse obtained at the terminals of the resistor 27 is transmitted through the diode 28 to the input of the amplifier 240 of the concentrator which notifies through trunk 203 the central office that the subscriber 101 requests a connect. The central office then sends at intervals of 100 microseconds the address codes of the line 101 to the decoding matrix 230 causing transformer 81 to apply sampling pulses to converter 40 and to shaper 50 as well as reply pulses to amplifier 240. The subscriber 101 then receives the dialing tone and the breaks in the loop effected by his dial cause the extinction and illumination of the lamp 21 at the dialing frequency. It follows that the resistance of the element 22 is modulated at the same frequency and that the alternation of reply signals or the absence of these signals enables the central office to record the number of the called station. Sampling pulses are then sent to this latter every hundred microseconds to enable it to demodulate the calling signals which are applied to its reception channel as is customary in electronic exchanges and the removal of its handset notifies the central office that the communication has been established. The concentrator then operates as an ordinary time-division telephone switching network. At the end of the conversion, the replacement of the handset extinguishes the neon lamps, such as 21, of the two line equipments which indicates to the central office that the communication is terminated. The time intervals which were devoted to this communication are then used for testing the idle lines.

Figure 2:
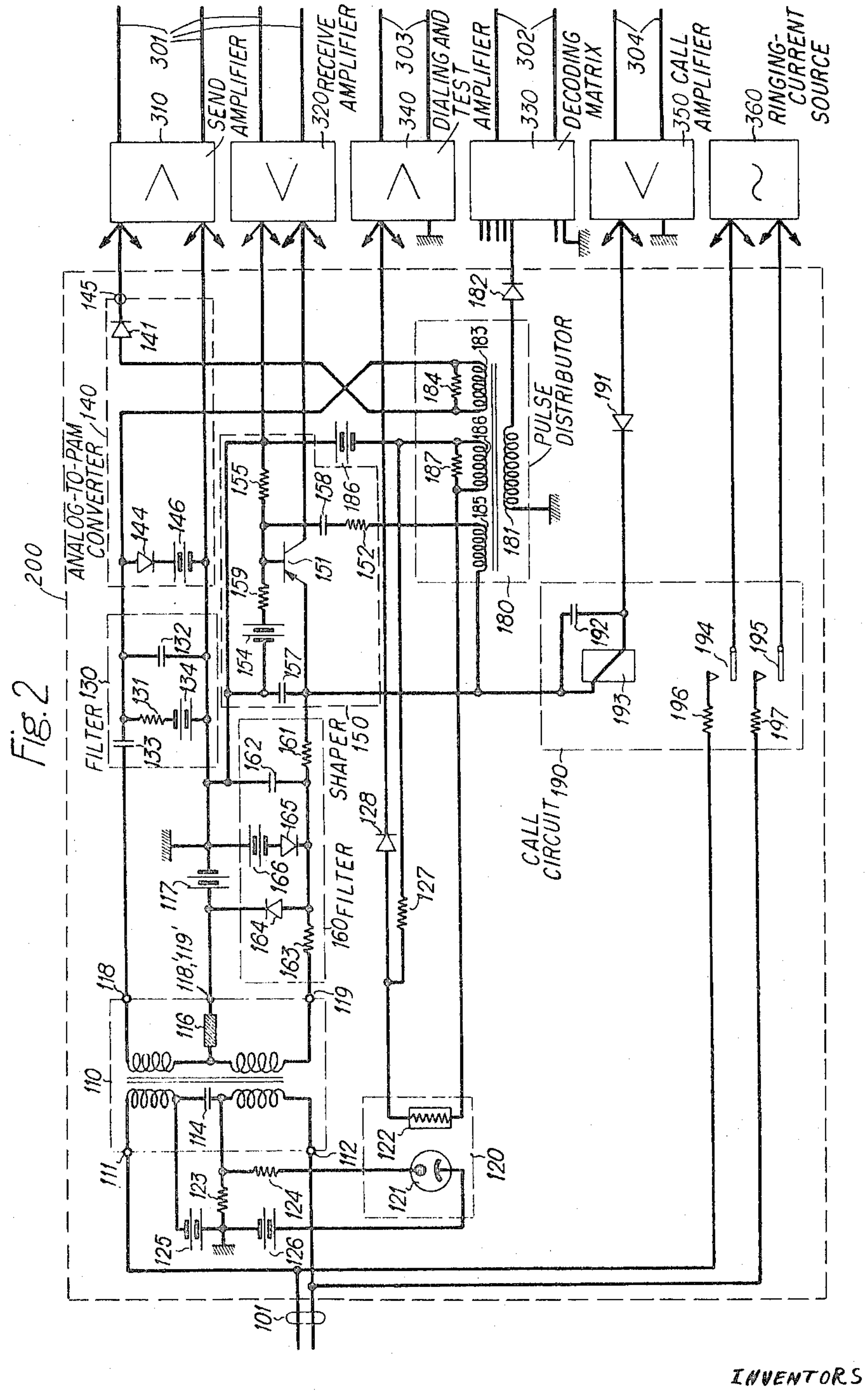
FIG. 2 shows digarammatically a subscriber's equipment according to a second embodiment of the invention.

In FIG. 2, which shows diagrammatically the second embodiment of the subscriber's line equipment, the elements of that equipment which perform functions similar to those of the elements of the subscriber's line equipment of FIG. 1 are designated by the same reference numerals increased by 100, and the ringing circuit peculiar to this second embodiment is indicated in its entirety by the reference numeral 190.

The subscriber's line equipment of FIG. 2 is associated on the one hand with the subscriber's line 101 and on the other hand with the common send amplifier 310, the common receive amplifier 320, the decoding matrix 330 and the common dialing and test amplifier 340, like the subscriber's line equipment of FIG. 1, and is additionally associated with two other amplifiers which are a common calling pulse amplifier 350 and a symmetrical 110 volt 60 cycle generator 360. Amplifier 350 is connected to the central office via trunk 304. If the concentrator serves, under the control of the central office, the same number of subscribers' lines as in the case of FIG. 1, that is to say 128 lines such as 101, and can provide in the same way a maximum of 16 simultaneous communications in a cycle of 100 microseconds divided into 16 time intervals of approximately 6 microseconds, the central office sends successively to the concentrator, in coded form, the addresses of the occupied lines and during the remainder of the cycle the addresses of the idle lines. At each line equipment constituted in this manner, the decoding matrix 330 applies selectively a pulse of approximately four microseconds, two successive pulses of the decoding matrix 330 being separated by a guard interval of about two microseconds. As in the preceding case, these pulses serve at the same time as pulses for testing the condition of the subscriber's lines connected to the concentrator and pulses for sampling the analog speech signals coming from the subscribers and demodulating the amplitude-modulated pulses entering the concentrator from the central office. The concentrator transmits to the central office through amplifier 340 signals in response to the test pulses which are samples of the incoming analog speech signals. In order to avoid the appearance between equipments which are consecutively unblocked of substantial cross-talk due to the stray capacitance of the wiring which is in parallel with the input impedance of the common send amplifier 310, the input of this amplifier is short-circuited during the guard intervals which separate two consecutive pulses. The amplifier 320 can transmit to the line equipments either amplitude-modulated pulses (PAM) or, in coincidence with the sampling pulses relating to a called subscriber designated by the central office, pulses of high and constant amplitude causing the unblocking of the call circuit 190 of the said subscriber. The amplifier 350 transmits to the line equipments, in coincidence with the said constant high amplitude pulses, pulses actuating the call circuit of the said called subscriber and the transmission to his line of the 50 cycle signal supplied by the generator 360.

The subscriber's equipment comprises essentially a differential transformer 110 with which is associated a device 120 for coupling the subscriber's line 101 to the test circuits and to the amplifier 340, a pulse distributor 180 connected to an individual output of the decoding matrix 30, a first chain which is intended for the modulation of the sampling pulses by the analog telephone signals generated by the subscriber and which is connected to the send amplifier 310 and consists of an analog-to-PAM (pulse-amplitude-modulation) converter 140 of the asymmetric type preceded by a filter 130, a second chain intended for the demodulation of the pulses coming from the amplifier 320 and consisting of a transistor demodulator 150, a filter network 160 and the call circuit 190.

The differential transformer 110 and the coupling device 120 are identical with the differential transformer 10 and the coupling device 20 of FIG. 1 with the single exception that the balancing network 16 is connected to ground by a positive biasing supply 117.

The chain of networks allocated to the analog speech signals generated by the subscriber comprises a filter 130 and an analog-to-PAM converter 140 in series with a secondary winding 183 of a transformer 180 with three secondaries 183, 185 and 186, to the primary 181 of which there are applied through the intermediary of a diode 182 the pulses distributed by the decoding matrix 330.

The filter 130 consists of a capacitor 133, in series between the terminal 118 and the converter 140, and a resistor 131 and capacitor 132 in parallel which constitute the load impedance of the transmitting half-winding of the secondary winding of the transformer 110. In the absence of sampling pulses, the diode 141 of converter 140 is blocked by a negative biasing source 134 connected between the resistor 131 and ground. The diode 141 thus inversely biased by the source 134 additionally serves to protect the equipment against accidental negative over-voltages insufficient to cause the operation of the standard lightning protectors which protect telephonic lines. A similar protection against positive over-voltages is provided by a diode 144 which connects the line wire to ground through a source 146 of positive voltage which biases it inversely. During a negative sampling pulse applied to primary 181 of transformer 180 the winding 183, which is damped by a shunt resistor 184, behaves as a voltage source of negligible internal impedance in opposition to the source 134. The capacitor 132 behaves as a short-circuit for the pulse voltage which appears at the terminals of the winding 183, as a result of which, the losses in this winding and in the diode 141 being very low, the potential of the input terminal 145 of the amplifier 310 aligns itself to within about 2 decibels with the potential of the terminal 118. The transmission chain thus delivers to the common send amplifier 310 a pulse-like voltage the amplitude of which is proportional to the analog voltage supplied by the subscriber station during the sampling pulses. It can be considered as a generator the impedance of which, seen from the side of the amplifier 310, has a very high value when the diode 141 is blocked and a low value during the sampling pulses. The decay of the trailing edge of the modulated pulse which appears at the terminal 145 where there is a high capacitance has no effect on the amplifier 310 owing to the fact that the input circuit of this latter is short-circuited during the guard interval between two consecutive sampling pulses, as indicated above.

The chain of networks allocated to the analog speech signals received by the subscriber comprises a shaper 150 followed by a filter network 160. The shaper 150, which serves also as a demultiplexing circuit selecting the pulses addressed to a given subscriber, consists of a transistor 151 having its collector connected to the output of the amplifier 320 from which it receives amplitude-modulated-pulses (PAM pulses), its emitter connected on the one hand to ground through a capacitor 157 and to the filter 160, and on the other hand to one end of the secondary winding 185 of the transformer 180, and has its base connected to the other end of the winding 185 through an R.C. circuit comprising a capacitor 158 and a resistor 152 in series. In the absence of sampling pulses the transistor 151 is blocked by a positive biasing source 154 and a bridge of two resistors 159 and 155. When a sampling pulse is transmitted to the primary 181 of the pulse distributor 180, its winding 185 applies between the emitter and base of transistor 151 a voltage pulse which opposes the voltage produced by the biasing source 154 and renders the base of this transistor sufficiently negative with respect to its emitter that it becomes saturated and has a very low emitter-collector resistance, enabling very rapid charging of the capacitor 157 to the potential of the amplitude-modulated-pulse (PAM pulses) applied by the common receive amplifier 320 to the collector of the transistor 151. Thus, for the whole of the duration of the sampling pulse the potential of the base is linked with that of the emitter whatever may be the potentials of the emitter and collector, so that the charging of the capacitor 157 is effected through a resistance of the order of 1 ohm the variations of which are small and have no significance when account is taken of the values of the elements of filter 160.

Figure 3:
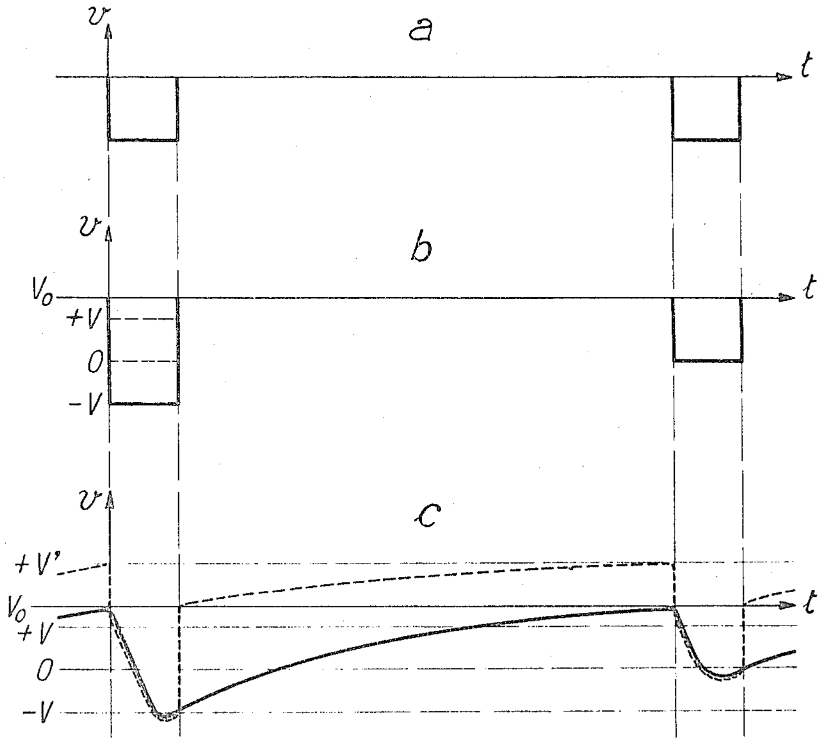
FIG. 3 is an explanatory diagram.

FIG. 3 shows the conditions of operation of the transistor 151.

Diagram *a* shows two successive sampling and test pulses applied through the matrix 330 to the primary 181 of pulse distributor 180 and appearing at the terminals of its winding 185.

Diagram *b* shows two modulated pulses applied through the amplifier 320 to the collector of the transistor 151 during the sampling pulses of diagram *a*. The pulses applied to the collector of the transistor 151 are negative pulses the voltage of which varies between a value of +V, less than the value $V_0$ of the source 117 which is connected to the emitter of the transistor 151 through the balancer 116 of the reception half-winding of the transformer 110 and the filter 160, and a value —V.

Diagram *c* shows in full line the variations of the potential of the emitter of transistor 151 and in broken line the variations of its base potential. The emitter potential varies, during the sampling pulses, from a value close to $V_0$ to a value between +V and —V which is that of the amplitude-modulated pulse applied to the collector, and in the interval between two sampling pulses, from the potential thus attained to a potential close to $V_0$. The base potential varies during the sampling pulses at first abruptly from a value $V'>V_0$ which is determined by the voltage of the source 154 and the values of the resistors 159 and 155, to a value slightly less than that of the emitter whose variation it follows until the end of the sampling pulse and climbs steeply to the value $V_0$ at the end of this pulse to reach progressively the value V' during the discharge of the capacitor 158.

Filter 160 is essentially a T-filter composed of two resistors 161 and 163 in series between the collector of transistor 151 and ground and a capacitor 162 connected between the common point of resistors 161 and 163 and ground. Additionally, it includes between the common point of these resistors and ground two diodes 164 and 165 in parallel and connected in opposite senses, respectively inversely biased by the source 117 and a source 166, serving to protect the equipment against accidental over-voltages.

The third secondary winding 186 of pulse distributor 180 serves to transmit the sampling pulses to the coupling devices 120 to determine if the line 101 is open or closed. The terminals of the winding 186, which are shunted by a damping resistor 187, are connected to the input of the common dialing and test signal amplifier 240 by a potentiometer device, consituted by the photosensitive element 122 and a resistor 127, and by a diode 128 constituting with the group of similar diodes of the other subscribers' equipments and OR gate which isolates one from another the signalling circuits of the subscriber's equipments. In the absence of sampling and test pulses, the diode 128 is blocked by a negative biasing source 186.

The calling circuit 190 is provided to permit the use of bells or standard buzzers which are generally used with subscriber's telephone stations. It consists of a coil 193 the winding of which is shunted by a capacitor 192 and is connected on the one hand to the emitter of transistor 151 and on the other hand through a diode 191 to the output of the common pulse amplifier 350. Coil 193 controls two contacts 194 and 195 which may be, for example, reed switches, respectively arranged in series with resistors 196 and 197 between the output terminals of the symmetrical 60-cycle signal generator 360 and the two wires of the line 101.

When the central office has recorded the number of the called subscriber, as has been explained in connection with FIG. 1, it sends at every 100 microseconds to the concentrator serving the equipment of this subscriber, the coded address of his line, for example 101, followed by the code combination indicating a modulation to the potential —V and a supplementary binary element which is characteristic of a call. As a result, in coincidence with the application of a sampling and test pulse by the matrix 330 to the called subscriber's equipment, the amplifier 320 supplies a pulse of amplitude —V, and the amplifier 350 the output of which is normally at the potential $—V_0$ less than —V supplies a positive pulse.

At each coincidence of these two last pulses which are in phase and of the same duration, the capacitor 192 charges through the diode 191, the coil 193 presenting a high impedance to these pulses. Between two consecutive pulses the diode 191 is blocked and the capacitor 192 discharges through the coil 193 but its discharge is only partial so that the reed switches 194 and 195 come into operation applying to the subscriber's bell the 60-cycle signal provided by the generator 360 and remain in this condition as long as the supplementary binary element is transmitted by the exchange, that is to say as long as the called subscriber does not remove his handset. As soon as the communication is established the concentrator operates as in the case of FIG. 1.

What we claim is:

1. In a time-division telephone switching system, a subscriber's line equipment which is adapted to convert analog speech signals from a subscriber to outgoing PAM (pulse-amplitude-modulation) signals, to convert incoming PAM signals to analog speech signals to said subscriber and to test the condition of the two-wire subscriber's line comprising in combination a duplexer means connecting said two-wire subscriber's line to a send-channel and to a receive-channel, an analog-to-PAM converter inserted in said send-channel, a PAM-to-analog converter inserted in said receive-channel, a light source inserted in said subscriber's line and illuminated when the subscriber's line is looped, an auxiliary signalling circuit associated with the subscriber's line, a photoconductive cell inserted in said auxiliary signalling circuit and cooperating with said light source and a sampling and test pulse generator simultaneously feeding with sampling pulses the analog-to-PAM converter and the PAM-to-analog converter and with test pulses the auxiliary signalling circuit, whereby the amplitude of the pulses developed across the photoconductive cell in response to said test pulses selectively depends upon the condition of the subscriber's line.

2. In a time-division telephone switching system, a subscriber's line equipment according to claim 1 in which the subscriber's line is connected to a central battery through a resistor and the light source is a signalling lamp connected across said resistor.

3. In a time-division telephone switching system, a subscriber line assembly comprising a plurality of subscriber's line equipments and adapted to convert analog speech signals from the subscribers to outgoing multiplexed PAM signals, to convert incoming multiplexed PAM signals to analog speech signals to said subscribers and to derive from the subscriber line conditions the resulting multiplexed signals having two amplitude values, the first corresponding to an open subscriber's line and the second to a looped subscriber's line, comprising in combination duplexer means respectively connecting the two-wire subscriber lines to send-channels and to receive-channels, analog-to-PAM converters respectively associated with the subscriber lines and inserted in said send-channels, PAM-to-analog converters respectively associated with the subscriber lines and inserted in said receive-channels, means for connecting in parallel all the send-channels and all the receive-channels respectively, light sources respectively inserted in the subscriber lines and illuminated when the subscriber lines are looped, auxiliary signalling circuits associated with the subscriber lines, photoconductive cells respectively inserted in said auxiliary signalling circuits and cooperating with said light sources, a sampling and test pulse distributor cyclically feeding at recurrent times with sampling pulses the analog-to-PAM converters and the PAM-to-analog converters and with test pulses the auxiliary signalling circuits associated with the different subscriber lines and an OR-gate connected to the different photoconductive cells, whereby the said resulting multiplexed signals are obtained at the output of said OR-gate.

4. In a time-division telephone switching system, a subscriber's line equipment adapted to convert analog speech signals from a subscriber to outgoing PAM signals, to convert incoming PAM signals to analog speech signals to said subscriber, to test the condition of the two-wire subscriber's line and to ring a called subscriber, comprising in combination a duplexer means connecting said two-wire subscriber's line to a send-channel and a receive-channel, an analog-to-PAM converter inserted in said send-channel, a PAM-to-analog converter inserted in said receive-channel, a light source inserted in said subscriber's line and illuminated when the subscriber's line is looped, an auxiliary signalling circuit associated with the subscriber's line, a photoconductive cell inserted in said auxiliary signalling circuit and cooperating with said light source, a ringing machine inserted in said ringing circuit, a first generator of sampling pulses, test pulses and first ringing pulses of one polarity simultaneously feeding with sampling pulses the analog-to-PAM converter and the PAM-to-analog converter, with test pulses the auxiliary signalling circuit and with first ringing pulses the ringing circuit and a second generator of second ringing pulses of the other polarity synchronous with the first ringing pulses feeding the ringing circuit, whereby the amplitude of the pulse developed across the photoconductive cell in response to said test pulses selectively depends upon the condition of the subscriber's line and the ringing machine is actuated by simultaneously receiving the first and second ringing pulses.

References Cited by the Examiner

UNITED STATES PATENTS 2,957,949 10/1960 James et al. -------- 179—18.3

KATHLEEN H. CLAFFY, *Primary Examiner.*

WILLIAM C. COOPER, *Examiner.*